United States Patent [19]

Vaughan

[11] Patent Number: 4,927,480

[45] Date of Patent: May 22, 1990

[54] METHOD AND CLAMPING DEVICE FOR BONDING THIN LENS WAFERS

[75] Inventor: Thomas L. Vaughan, La Jolla, Calif.

[73] Assignee: Signet Armorlite, Inc., San Marcos, Calif.

[21] Appl. No.: 315,548

[22] Filed: Feb. 27, 1989

[51] Int. Cl.⁵ .................... B29C 65/48; B32B 1/00
[52] U.S. Cl. ................... 156/228; 156/99; 156/295; 156/581; 156/583.3
[58] Field of Search ........... 156/228, 295, 581, 583.3, 156/87, 99, 104; 350/417; 425/808; 100/211, 212; 264/1.7, 2.2, 2.4, 2.7

[56] References Cited

U.S. PATENT DOCUMENTS 4,564,408  1/1986  Crumbach et al. ............... 156/581

FOREIGN PATENT DOCUMENTS 48-11588  4/1973  Japan ............................... 156/295

*Primary Examiner*—Joye L. Woodard
*Attorney, Agent, or Firm*—Marshall, O'Toole, Gerstein, Murray & Bicknell

[57] ABSTRACT

A clamping device for bonding lens wafers, the device having a resilient stamp and an oppositely-disposed resilient mold. The stamp surface is slightly more curved than the concave surface of the top wafer and the mold surface is slightly more planar than the convex surface of the bottom wafer. As the wafers are squeezed between the stamp and mold, the stamp and mold deform and bonding material is squeezed evenly outwardly between the wafers.

17 Claims, 2 Drawing Sheets

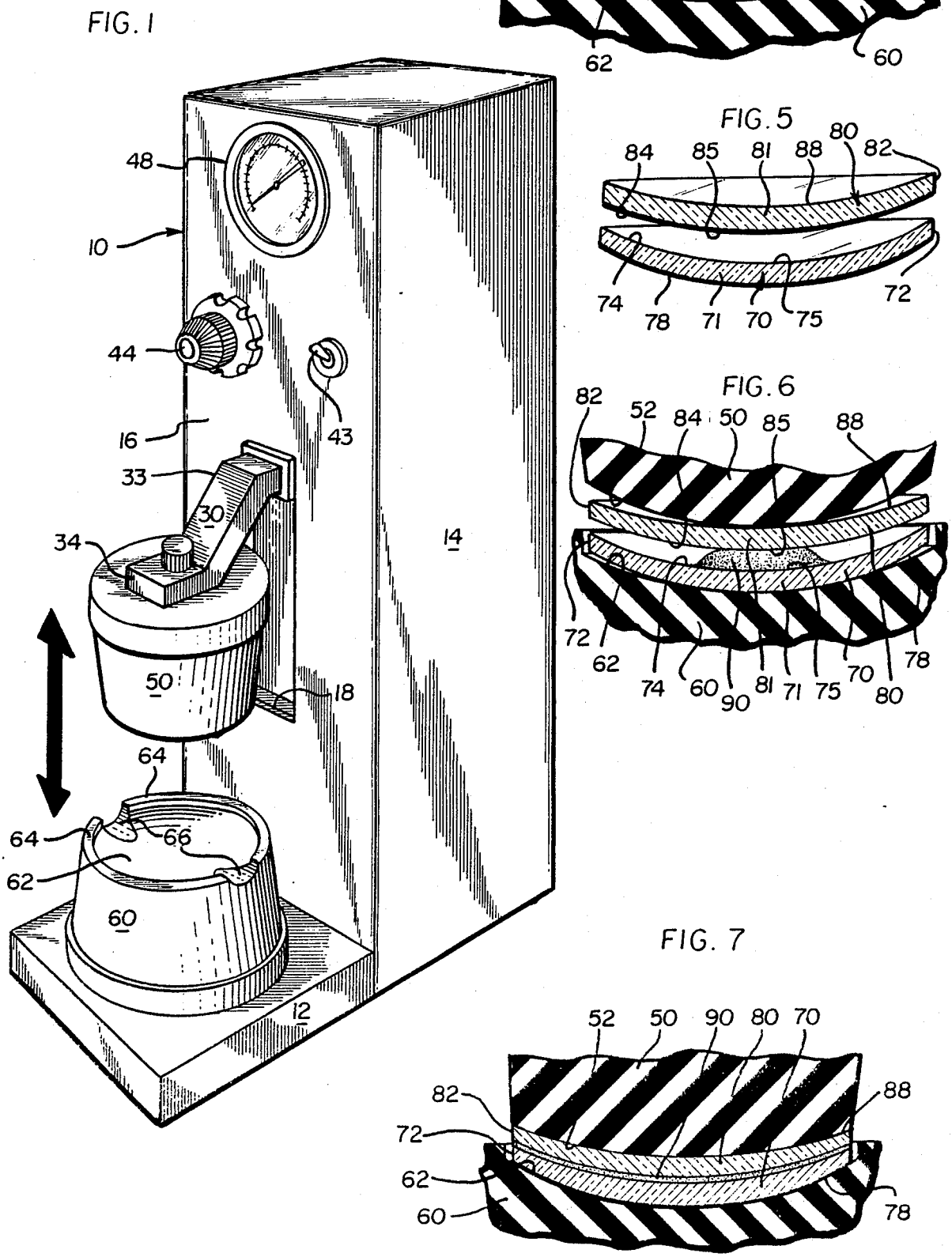

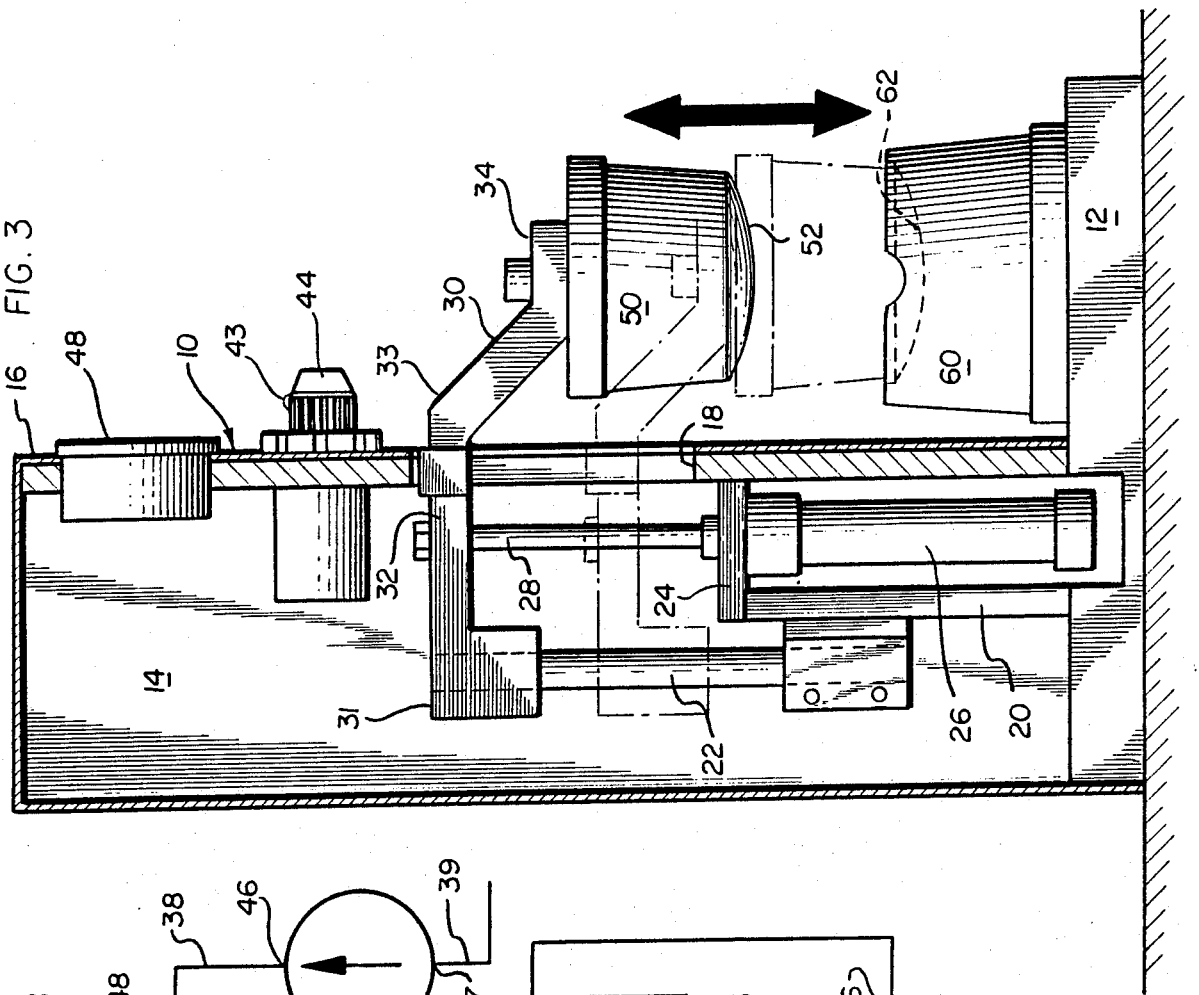
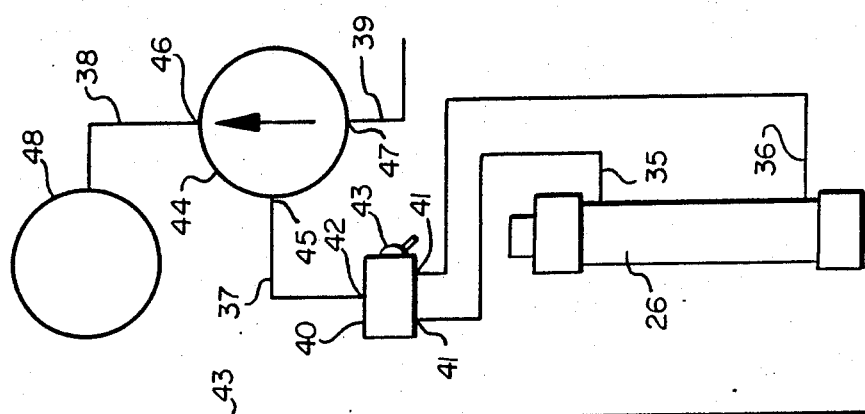
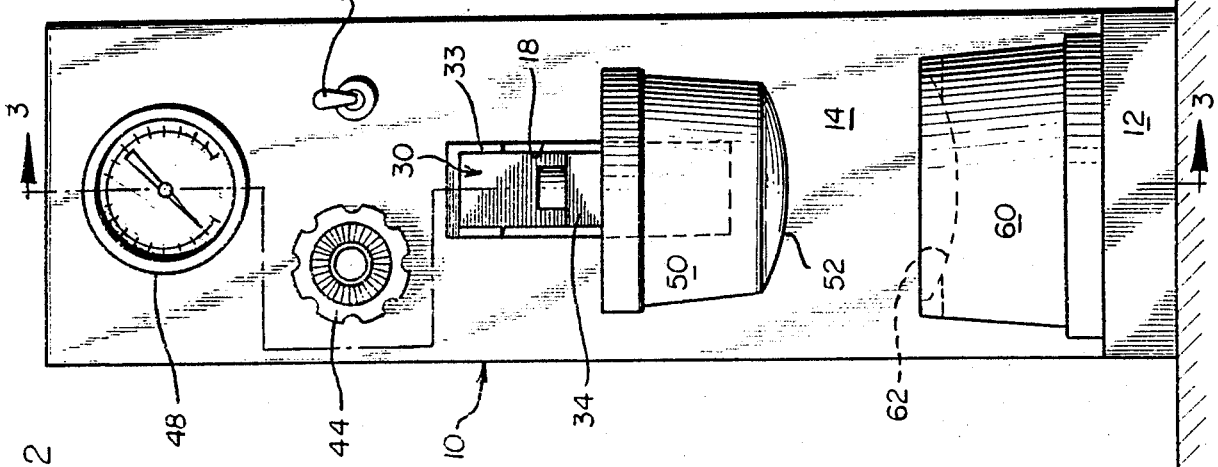

METHOD AND CLAMPING DEVICE FOR BONDING THIN LENS WAFERS

BACKGROUND OF THE INVENTION

This invention relates generally to a device and method used in the manufacture of composite optical lenses, and more particularly to a device and method for spreading liquid bonding material evenly between the individual lens wafers used in making a composite optical lens, such as a lens for eyeglasses.

Optical lenses have a front outer surface and a back outer surface, through each of which light enters and leaves the lens. A composite lens is made by joining together a separately-formed front lens wafer and a separately-formed back lens wafer. Each lens wafer has an outer surface and a bonding surface. The wafers are joined together at their bonding surfaces. The outer surfaces of the front and back wafers form, respectively, the front outer surface and back outer surface of the composite lens.

When a composite lens is to be used for eyeglasses, the front lens wafer has a convex outer surface and a concave bonding surface. The back lens wafer has a concave outer surface and a convex bonding surface that matches the concave bonding surface of the front wafer. The two wafers are joined together by spreading a liquid bonding material evenly across the bonding surfaces of the wafers and assembling the wafers so their bonding surfaces are brought together. The bonding material is subsequently cured.

One problem in the manufacture of composite lenses is in preventing bubbles of air from being trapped in the bonding material between the lens wafers. For composite lenses made from glass wafers, such air bubbles can be forced out from between the wafers by applying finger pressure at a number of points to the outer surfaces of the assembled wafers before the bonding material is cured.

However, for composite lenses made from thin plastic lens wafers, the application of finger pressure can cause deformation of the wafers at each specific point where the pressure is applied. These deformations in turn cause the layer of bonding material to become uneven. This can cause optical distortions in the composite lens.

SUMMARY OF THE INVENTION

The clamping device and method of the present invention solve the problem of removing air from between lens wafers, while preventing deformations of the wafers and maintaining an even layer of bonding material between the wafers. A quantity of bonding material is first applied to a central portion of the bonding surface of one of the wafers. The bonding surface of the other wafer is then brought into contact with the quantity of bonding material on the one wafer. Next, a clamping device is used to spread the bonding material evenly across the entireties of the bonding surfaces and to remove air bubbles.

The clamping device comprises a deformable, resilient mold and a deformable, resilient stamp in vertically spaced relation. The deformable mold has a concave surface that is slightly more planar than the convex outer surface of the front lens wafer. The deformable stamp has a convex surface that is slightly more curved than the concave outer surface of the back lens wafer.

A piston and associated linkage move the deformable stamp and mold towards each other, and this exerts a pressure on the outer surfaces of the assembled lens wafers. The differences in the degree of curvature of the convex and concave surfaces of the deformable stamp and mold compared to the corresponding curvature of the outer surfaces of the wafers causes the initial pressure exerted by the deformable stamp and mold to be limited to a relatively small central portion of the outer surfaces of the wafers. The initial pressure forces the central portions of the bonding surfaces of the wafers towards one another, and this squeezes air and excess bonding material evenly outwardly from between the wafers towards the periphery of the wafers.

As the deformable stamp and mold are moved closer to each other, their convex and concave surfaces deform. As these surfaces deform, pressure is exerted on an increasingly relatively larger portion of the outer surfaces of the lens wafers. Increasingly larger portions of the bonding surfaces are correspondingly forced towards one another, squeezing air and excess bonding material still further peripherally outwardly from between the wafers.

The stamp and mold are moved continuously closer until they deform sufficiently to exert pressure on the entirety of the outer surfaces of the lens wafers. Air and excess bonding material are eventually driven outwardly beyond the periphery of the wafers, leaving an air-free layer of bonding material spread evenly between the wafers.

Because of the deformable nature of the mold and stamp, the clamping device exerts a generally uniform pressure on all engaged portions of the assembled lens wafers during the clamping step. This uniform pressure prevents the occurrence of localized deformations of the lens wafers in the composite lens.

Other features and advantages are inherent in the structure and method claimed and disclosed or will become apparent to those skilled in the art from the following detailed description in conjunction with the accompanying drawings.

BRIEF DESCRIPTION OF THE DRAWINGS

FIG. 1 is a perspective of an embodiment of a clamping device in accordance with the present invention;

FIG. 2 is a front view of the device;

FIG. 3 is a sectional view taken along line 3—3 of FIG. 2;

FIG. 4 is an enlarged, fragmentary, sectional side view of a portion of the device;

FIG. 5 is an enlarged side view of a set of front and back lens wafers used in connection with the device;

FIG. 6 is an enlarged, fragmentary, sectional side view showing a portion of the device at the beginning of one method step in accordance with the present invention;

FIG. 7 is an enlarged, fragmentary, sectional side view showing the same portion of the device at the end of the step; and FIG. 8 is a schematic of the pneumatic system of the device.

DETAILED DESCRIPTION

Referring initially to FIG. 1, indicated generally at 10 is a clamping device for use in the manufacture of composite eyeglass lenses in accordance with the present invention. Clamping device 10 comprises a base 12 and a housing 14 extending upwardly from the rear of base 12 and having a vertical front plate 16.

As seen in FIG. 3, a post 20 extends vertically upwardly from base 12 within housing 14 behind front plate 16. A glide 22 is mounted at the rear of post 20 and extends vertically upwardly from post 20 within housing 14. A support 24 extends frontwardly from the top of post 20 to front plate 16. An air cylinder 26 is mounted beneath support 24 and extends downwardly between front plate 16 and post 20. A piston, not shown, is mounted for vertical movement within air cylinder 26. A piston rod 28 is attached to the top of the piston and projects upwardly out of air cylinder 26 and above support 24. The upper end of piston rod 28 is fastened to a middle portion 32 of an arm 30 extending horizontally above support 24 to an interior end 31 mounted for vertical movement along glide 22. Middle portion 32 of arm 30 extends forwardly through an aperture 18 on front plate 16 (FIG. 2). A sloping portion 33 of arm 30 extends from middle portion 32 to an outside end 34 of the arm.

As seen in FIG. 8, a pneumatic upper line 35 and a pneumatic lower line 36 each extend from air cylinder 26 to outlet ports 41, 41 of a gate valve 40. Upper line 35 connects to the interior of air cylinder 26 above the piston, while lower line 36 connects to the interior of the cylinder below the piston. Valve 40 has two positions, one position opening a pneumatic path from a valve inlet port 42 to upper line 35 and the other position opening a pneumatic path from the inlet port to lower line 36. A pneumatic valve line 37 connects valve inlet port 42 to a first outlet port 45 of a regulator 44. A pneumatic inlet line 39 connects an inlet port 47 of regulator 44 to an outside source of air pressure, such as an air compressor (not shown). A second outlet port 46 of regulator 44 is connected by a pneumatic gauge line 38 to an air pressure gauge 48.

As seen in FIGS. 1–3, regulator 44 and pressure gauge 48 are each mounted on front plate 16. Valve 40 is mounted behind front plate 16 (FIG. 3), and is connected to a switch 43 mounted on the front plate. Switch 43 has an up position that moves valve 40 to open the pneumatic path to lower line 36. Switch 43 also has a down position that moves valve 40 to open the pneumatic path to upper line 35.

A deformable stamp 50 is mounted at the bottom of outside end 34 of arm 30. Disposed below stamp 50 is a deformable mold 60 mounted at the top of base 12. Both stamp 50 and mold 60 are constructed of a soft, resilient material, preferably silicone rubber.

Referring to FIG. 5, the composite lens is manufactured by bonding together a front lens wafer 70 and a back lens wafer 80. Wafers 70, 80 are formed separately, and may be constructed of either glass or plastic. Front wafer 70 comprises a convex outer surface 78 and a concave bonding surface 74. Back wafer 80 comprises a concave outer surface 88 and a convex bonding surface 84. The two wafers 70, 80 are bonded together at their respective bonding surfaces 74, 84 so that light will enter and leave the composite lens through outer surfaces 88, 78, respectively.

To bond the wafers, front wafer 70 is first disposed with bonding surface 74 facing upwardly, and a quantity of bonding material 90 (FIG. 6) is applied to a central portion 75 of the bonding surface. For plastic lens wafers, bonding material 90 can be the same material from which the wafers were cast. It is preferable, in making conventionally-sized eyeglass lenses, that the quantity used measure about 0.2 ml. Back wafer 80 is then aligned on top of front wafer 70 so a central portion 85 of bonding surface 84 comes into contact with bonding material 90.

Superimposed lens wafers 70, 80 are then placed atop mold 60 of clamping device 10 on a concave mold surface 62. Mold surface 62 is slightly more planar than convex outer surface 78 of front wafer 70. In this embodiment, mold surface 62 is paraboloidal, and has a focal length that is slightly longer than the focal length of convex outer surface 78. It is preferable that mold surface 62 measure at least about ½ smaller in diopter than wafer outer surface 78: the diopter of each surface being defined as the reciprocal of its focal length in millimeters. If clamping device 10 is to be used with a set of front wagers ranging from 4½ to 5½ in diopter, it would be preferable for mold surface 62 to have a diopter of 4. Wafers 70, 80 are placed atop mold surface 62 with wafer outer surface 78 facing down. Raised rim elements 64, 64 (FIG. 1) extend upwardly from portions of the periphery of mold surface 62 and allow the operator to center superimposed wafers 70, 80 on the mold surface. As seen in FIG. 6, the difference in curvature between mold surface 62 and outer surface 78 causes front wafer 70 to rest with only a relatively small central portion 71 of the wafer touching the mold surface.

Referring to FIG. 8, air pressure is then supplied to clamping device 10 through a pneumatic path from inlet line 39 to regulator 44 to valve tube 37 to valve 40. Switch 43 is positioned so that valve 40 continues the pneumatic path to lower line 36 and to the interior of air cylinder 26 below the piston. The pressure urges piston and piston rod 28 upwardly. As this occurs, stamp 50 is correspondingly moved upwardly away from mold 60. The pressure being supplied to air cylinder 26 is also measured and displayed on pressure gauge 48 through gauge line 38.

The operator uses regulator 44 to adjust the pressure being supplied to air cylinder 26, and then flips switch 43 to divert the pneumatic path from valve 40 to upper line 35 and to the interior of air cylinder 26 above the piston. The pressure then urges the piston and piston rod 36 downwardly. Stamp 50 is correspondingly moved downwardly toward mold 60. In this embodiment, it is preferable that the downward movement of stamp 50 does not exceed about one inch, or 25 mm, per second.

Referring to FIG. 6, the bottom of stamp 50 comprises a convex stamp surface 52 that is slightly more curved than concave outer surface 88 of back wafer 80. In this embodiment, stamp surface 52 is paraboloidal and has a focal length that is slightly shorter than the focal length of concave outer surface 88. It is preferable that stamp surface 52 measure at least about ½ larger in diopter than outer surface 88. If clamping device 10 is to be used with a set of back wafers ranging from 5 to 8 in diopter, it would be preferable for stamp surface 72 to have a diopter of 8½. When stamp surface 52 meets outer surface 88, the difference in curvature causes the initial pressure exerted on wafers 70, 80 to be limited to a relatively small central portion of the wafers, as seen in FIG. 6. This forces the central portions 75, 85 of bonding surfaces 74, 84 towards one another, squeezing air and excess bonding material evenly outwardly from between wafers 70, 80 towards their peripheries 72, 82.

As stamp 50 is urged further downwardly, stamp surface 52 and mold surface 62 deform, bringing them into contact with increasingly relatively larger portions of wafers 70, 80. Increasingly larger portions of bonding surfaces 74, 84 are correspondingly forced together, squeezing air and excess bonding material still further peripherally outwardly between wafers 70, 80. Stamp surface 52 and mold surface 62 eventually deform sufficiently to come into contact with the entireties of outer surfaces 78, 88 of wafers 70, 80 (FIG. 7), and air and excess bonding material are driven outwardly beyond the peripheries 72, 82 of the wafers.

Switch 43 is then flipped to retract stamp 50 upwardly away from mold 60. Recesses 66, 66 (FIG. 1) on the top of mold 60 allow the operator to grasp assembled wafers 70, 80 and remove them from mold 60. Bonding material 90 can then be cured in a conventional manner, e.g. by exposure to ultraviolet light. It is preferable to wait about 60 seconds after the clamping operation before beginning curing. This waiting period may allow the dissipation of stresses built up in wafers 70, 80 during the clamping operation.

The foregoing detailed description is provided for clearness of understanding only, and no unnecessary limitations should be understood therefrom, as modifications will be obvious to those skilled in the art.

What is claimed:

1. A clamping device for squeezing a quantity of bonding material between a first bonding surface of a first lens wafer and a second bonding surface of a second lens wafer, said first lens wafer comprising a convex outer surface and said second lens wafer comprising a concave outer surface, said clamping device comprising:
   a deformable, resilient mold;
   said mold comprising a concave surface that is slightly more planar than said convex outer surface of said first lens wafer;
   a deformable, resilient stamp disposed opposite said mold;
   said stamp comprising a convex surface that is slightly more curved than said concave outer surface of said second lens wafer; and
   piston means for simultaneously exerting pressure on said convex and concave outer surfaces of said lens wafers through said concave surface of said mold and said convex surface of said stamp, respectively, thereby squeezing said quantity of bonding material between said bonding surfaces of said lens wafers.

2. A clamping device as recited in claim 1, wherein: said stamp and said mold are made of silicone rubber.

3. A clamping device as recited in claim 1, wherein said piston means comprises:
   an air cylinder;
   a pressure gauge for measuring the air pressure directed to said air cylinder; and
   means for adjusting said air pressure directed to said air cylinder.

4. A clamping device as recited in claim 1 wherein: said mold is fixed to a base with said concave surface facing upward;
   said stamp is mounted above said mold with said convex surface facing downward; and
   said clamping device comprises means mounting said stamp for vertical movement relative to said mold.

5. A clamping device as recited in claim 4 wherein: said mold comprises raised centering means around the periphery of said concave surface for centering and aligning said first lens wafer on said concave surface below said stamp.

6. A clamping device as recited in claim 1 wherein: said piston means comprises means for moving said mold and said stamp towards one another at a rate of about one inch per second.

7. A clamping device as recited in claim 1 wherein said concave mold surface is paraboloidal.

8. A clamping device as recited in claim 7, wherein: said mold surface measures at least about ½ smaller in diopter than said convex outer surface of said first lens wafer.

9. A clamping device as recited in claim 1 wherein said convex stamp surface is paraboloidal.

10. A clamping device as recited in claim 9, wherein: said stamp surface measures at least about ½ larger in diopter than said concave outer surface of said second lens wafer.

11. A method for bonding a first lens wafer comprising both a first bonding surface and a convex outer surface to a second lens wafer comprising both a second bonding surface and a concave outer surface, said method comprising the steps of:
    applying a quantity of bonding material to a center portion of one of said bonding surfaces;
    placing the other of said bonding surfaces in contact with said quantity of bonding material;
    providing a deformable, resilient mold comprising a concave surface that is slightly more planar than said convex outer surface of said first lens wafer;
    providing a deformable, resilient stamp disposed opposite said mold and comprising a convex surface that is slightly more curved than said concave outer surface of said second lens wafer; and
    simultaneously exerting pressure on said convex and concave outer surfaces of said lens wafers through said concave surface of said mold and said convex surface of said stamp, respectively, thereby squeezing said quantity of bonding material between said bonding surfaces of said lens wafers.

12. A method as recited in claim 11, comprising the additional step of:
    curing said quantity of bonding material after said pressure exerting step.

13. A method as recited in claim 11, comprising the additional step of:
    waiting about one minute between said pressure exerting step and said curing step.

14. A method as recited in claim 11, wherein: the refractive index of said bonding material applied in said application step is similar to the refractive indices of said lens wafers.

15. A method as recited in claim 11, wherein: said lens wafers are being bonded to form a lens for eyeglasses; and
    said quantity of bonding material is about 0.2 ml.

16. A method as recited in claim 11, comprising the additional steps of:
    centering said convex outer surface of said first lens wafer on said concave surface of said mold; and
    moving said convex surface of said stamp downwardly against said concave outer surface of said second lens wafer.

17. A method as recited in claim 16, wherein: said convex surface of said stamp is moved downwardly at a rate of about one inch per second.

* * * * *